United States Patent [19]
Gurley et al.

[11] Patent Number: 5,644,360
[45] Date of Patent: Jul. 1, 1997

[54] CIRCUIT FOR COMPENSATING THE BLUE PHOSPHOR ROLL OFF AT HIGH DRIVE LEVELS IN A PROJECTION TELEVISION SYSTEM

[75] Inventors: Thomas David Gurley, Indianapolis; Charles Michael White, Noblesville, both of Ind.

[73] Assignee: Thomson Consumer Electronics, Inc., Indianapolis, Ind.

[21] Appl. No.: 622,323

[22] Filed: Feb. 26, 1993

[51] Int. Cl.$^6$ .................................................. H04N 9/16
[52] U.S. Cl. ........................ 348/381; 348/707; 348/777
[58] Field of Search .................................. 348/380, 381, 348/645, 649, 652, 655, 656, 671, 675, 677, 776, 777, 687, 707, 709, 809, 223, 678, 679, 778, 750, 808; 330/250, 252, 277; H04N 9/64, 9/73, 5/68, 5/51, 9/16

[56] References Cited

U.S. PATENT DOCUMENTS

| | | | |
|---|---|---|---|
| 4,698,681 | 10/1987 | Kodlec et al. | 348/687 |
| 5,381,185 | 1/1995 | Ohki et al. | 348/652 |

FOREIGN PATENT DOCUMENTS

| | | | |
|---|---|---|---|
| 0404693 | 12/1990 | European Pat. Off. | H04N 9/31 |
| 5183928 | 7/1993 | Japan | H04N 9/73 |
| 2187069 | 8/1987 | United Kingdom | H04N 5/68 |

*Primary Examiner*—John K. Peng
*Assistant Examiner*—Jeffrey S. Murrell
*Attorney, Agent, or Firm*—Joseph S. Tripoli; Peter M. Emanuel

[57] ABSTRACT

In a projection television system, a blue phosphor roll-off compensation network is included in the emitter circuit of a common emitter configured transistor comprising the driver amplifier for the blue cathode ray tube. The roll-off compensation network includes a voltage divider connected between the emitter of the common emitter configured transistor and a source of a bias voltage, and a second transistor having its base connected to a point within the voltage divider and its collector-emitter path connected in series with a gain changing resistor between the emitter of the common emitter configured transistor and the source of the variable bias voltage. The voltage divider determines the level of drive current at which the second transistor is rendered conductive and thereby the point at which roll-off compensation is applied. The gain changing resistor determines the amount of compensation.

20 Claims, 2 Drawing Sheets

CIRCUIT FOR COMPENSATING THE BLUE PHOSPHOR ROLL OFF AT HIGH DRIVE LEVELS IN A PROJECTION TELEVISION SYSTEM

FIELD OF THE INVENTION

The invention concerns an arrangement which may be used to compensate for the so called blue phosphor "roll-off" characteristic of a cathode ray tube as may be employed in a projection television system.

BACKGROUND OF THE INVENTION

A projection television system includes three individual cathode ray tubes (CRTs), each having a different screen phosphor corresponding to one of red, green or blue colors. Relatively high level red, green and blue video drive signals are coupled to respective electron guns of the CRTs from respective drive amplifiers or "drivers" which amplify respective relatively low level red, green and blue video signals produced by a signal processing section. Usually, the video drive signals are coupled to the cathodes of the CRTs. In response to the respective video drive signals, the CRTs generate electron beams which strike the respective screen phosphors causing them to emit light outputs of particular wavelengths corresponding to respective colors. The light outputs produced by the CRTs are transmitted by an optical system to a screen where a composite color image is reproduced.

The intensity of the light produced by a CRT is a function of the intensity of the electron beam, which in turn, is a function of the magnitude of the drive signal coupled to an electron gun. When the magnitude of a video signal coupled to a driver is high, it is expected that a corresponding high intensity light output will be produced by the CRT. However, the efficiency of a phosphor to convert beam current to light may be reduced or "roll-off" as the magnitude of the drive signal increases. This is particularly a problem with the blue phosphor. More specifically, the blue phosphor becomes less efficient than the green and red phosphors as the CRTs are driven increasingly hard. This nonuniformity is due to the doping required to get the blue phosphor compound to emit light at the desired wavelength.

The problem of the blue phosphor inefficiency or roll-off is manifested in two ways. The first relates to "white balance" or grey scale retention, and the second relates to color fidelity.

Considering the case of white balance first, it is very desirable for a color television system to maintain constant white balance or grey scale. When "white" representative red, green and blue video signals are coupled to the image reproducing device, it should produce a "white" image. White comes in a variety of tints. For example, the "white" light produced by an incandescent light bulb is visibly more yellow than the "white" light produced by a fluorescent light bulb. The tint of white can be quantified by what is referred to as the "color temperature". The color temperature can be adjusted by setting the ratio's of the magnitudes of the red, green and blue CRT beam currents. A common value for the color temperature is designated as 9300 degrees Kelvin and corresponds to the following percentages of the total drive current for the red (R), green (G) and blue (B) drive currents:

R=12.9%
G=48.9%
B=38.2%

If the phosphors of the three CRTs were uniformly efficient, maintaining these percentages would produce a "white" image of the specified constant color temperature as the magnitudes of the drive currents increased together. However, the nonuniformity discussed above results in a very undesirable yellowing of peak "white" portions of an image.

In the case of color fidelity, a uniform color scale is also to be expected. Hues (or tints) are produced by ratios of red, green, and blue currents different than those required to make white. A particular hue should remain constant as the magnitudes of the drive currents increase together. Certain hues are affected more than others by the blue phosphor inefficiency. Flesh tones are very critical. Blue phosphor roll-off causes flesh tones to shift toward green. Of course, this is very undesirable.

Prior solutions to the blue phosphor roll-off problem have involved circuitry for boosting the current in the blue CRT at the point at which the blue phosphor efficiency begins to roll off. Typically, a switchable gain element is added to the blue CRT driver to selectively increase the gain of the driver so as to correspondingly increase the drive current for the CRT. The additional current intensifies the electron beam and causes the blue phosphor to be driven harder, thus increasing the light output of the blue CRT. The additional blue light output restores the white balance or hue of the image. Viewed another way, the prescribed current ratios are altered at some input signal level in order to compensate for the blue phosphor roll-off.

FIGS. 1 and 2 show diagrams of a projection television system with respective prior blue roll-off compensation networks as are known to the present inventors. The common components of the arrangements shown in these figures will be described before the respective roll-off compensation networks are individually described.

In each of these figures, a video signal processing unit 10 provides relatively low level red (R), green (G) and blue (B) video signals which are coupled to CRT drivers 12R, 12G and 12B, respectively. CRT drivers 12R, 12G and 12B amplify and invert the respective low level video input signal to produce a relatively high level video output signal suitable for driving a respective one of red, green and blue CRTs 14R, 14G and 14B. The light outputs of red, green and blue CRTs 14R, 14G and 14B are guided by an optical system (not shown) to a screen (not shown) where they are combined to produce a composite image.

With the exception of a blue roll-off compensation network, CRT drivers 12R, 12G and 12B are substantially identical, and accordingly only blue CRT driver 12B will be described in detail. Blue CRT driver 12B is shown as simply comprising a transistor QD in a common emitter amplifier configuration, although it will be appreciated that CRT drivers are in practice usually more complex. A relatively low level blue video input voltage VIN is coupled to the base of transistor QD and an inverted, relatively high level video output voltage VOUT is produced at the collector of transistor QD. The emitter of transistor QD is coupled to signal ground through an emitter resistor RE1 and its collector is coupled to a source of relatively high voltage B+ through a collector resistor RC. The collector of transistor QD is coupled to the cathode of a blue CRT 14B through a resistor RK. As video output voltage VOUT decreases from a blanking or black (BLANK) level, the beam current and the blue light output of blue CRT 14B increase. A network including the series combination of a resistor RE2, a variable resistor RE3 and an adjustable source of a bias voltage VBIAS is coupled parallel with emitter resistor RE1. Variable resistor RE2 is adjusted to adjust the gain of the driver 12B and is used in the color temperature adjustment. Bias voltage VBIAS is adjusted so that driver 12B and therefore CRT 14B are cutoff at the blanking (BLANK) level of the video input voltage VIN.

The blue roll-off compensation networks shown in FIGS. 1 and 2 each operate by increasing the emitter current of transistor QD, thereby correspondingly increasing the collector current, decreasing output voltage VOUT, increasing the blue beam current, and increasing the blue light output, at a magnitude of input voltage VIN which corresponds to the point at which the blue phosphor becomes relatively less efficient.

In the arrangement shown in FIG. 1, the blue roll-off compensation network comprises the series combination of a diode CRB and resistor RB connected in parallel with resistor RE2 of the emitter circuit of transistor QD. In this configuration, as the current flowing through resistor RE2 increases, due to increases of input voltage VIN, the voltage across resistor RE2 increases and will eventually become sufficient to cause diode CRB to conduct. As a result, the emitter current of transistor QD is increased (i.e., "boosted") by the current flowing through the series combination of diode CRB and resistor RB. The collector current of transistor QD is correspondingly increased, output voltage VOUT is decreased and the blue beam current is increased. This provides additional stimulus to the blue phosphor so as to correct for the roll-off.

The roll-off compensation network shown in FIG. 1 can be modified by adding one or more additional diodes in series with diode CRB and poled in the same sense. The roll-off compensation network shown in FIG. 1 can also be modified by utilizing a Zener diode poled in the opposite sense as diode CRB.

In the type of roll-off compensation network described with respect to FIG. 1, the point at which compensation will occur is primarily determined by the number of diodes which are used, and if a Zener diode is used, the Zener voltage; and the level of the current boost is primarily determined by the value of resistor RB.

In the arrangement shown in FIG. 2, the blue roll-off compensation network comprises the series combination of a diode CRB, a resistor RB and a source of bias voltage VBOOST connected in parallel with resistor RE1 of the emitter circuit of transistor QD. In this configuration, diode CRB will eventually be causes to conduct as the voltage across resistor RE1 increases due to increases of input voltage VIN. As a result, the emitter current of transistor QD is increased (i.e., "boosted") by the current flowing through the series combination of diode CRB and resistor RB. The collector current of transistor QD is correspondingly increased, output voltage VOUT is decreased, the blue beam current is increased, and additional stimulus is provided to the blue phosphor so as to correct for the roll-off.

In the type of roll-off compensation network described with respect to FIG. 2, the point at which compensation will occur is primarily determined by the magnitude of bias voltage VBOOST; and the level of the current boost is primarily determined by the value of resistor RB.

The adjustment of variable RE3 affects the amount of boost provided by the type of roll-off compensation network discussed with respect to FIG. 1, whereas it does not affect the amount of boost provided by the type of roll-off compensation network discussed with respect to FIG. 2. It is desirable for the adjustment of variable resistor RE3 to affect the gain of the roll-off compensation network for the following reasons.

Gain controlling variable resistor RE3 of each of drivers 12R, 12G and 12B is adjusted to provide the proper color temperature. Variable resistor RE3 is initially set to zero ohms. Increasing the resistance of variable resistor RE3 decreases the gain. For purposes of the color temperature adjustment, red, green and blue video signals corresponding to a completely white image (a so called 100 IRE full field image) are applied to drivers 12R, 12G and 12B. At this point, the automatic beam current limiting network (not shown) of the television system operates to limit the beam currents of CRTs 14R, 14G and 14B. Automatic beam current limiting networks typically included in television systems operate by sensing the average current drawn from the CRT high voltage power supply, and by reducing the red, green and blue beam currents by reducing the gains of the respective channels when the sensed current exceeds a predetermined threshold. If the resistance of variable resistor RE3 for blue driver 12B needs to be increased to decrease the gain of blue driver 12B in order achieve the proper color temperature when the television system is operating to produce a 100 IRE full field image, it is likely that less boost will be needed for this condition than in the condition in which variable resistor RE3 does not need to be adjusted. Therefore, it is desirable for the blue roll-off compensation network to track the adjustment of variable resistor RE3, as is the case for the type of roll-off compensation network discussed with respect to FIG. 1.

The type of roll-off compensation network discussed with respect to FIG. 1 is also more advantageous than the type of roll-off compensation network discussed with respect to FIG. 2 with regard to the DC output conditions of video signal processing unit 10, as will now be discussed.

Video signal processing unit 10 usually includes a video processing integrated (IC) which produces relatively large and unpredictable DC offsets at its R, G and B outputs. The DC offsets are coupled to the bases of transistors QD of respective drivers 12R, 12G and 12B and make it desirable for bias voltage VBIAS for each of drivers 12R, 12G and 12B to be adjustable to compensate for the respective offsets. In the type of blue roll-off compensation network described with respect to FIG. 1, in which the threshold element is coupled between the emitter of transistor QD and the source of variable bias voltage VBIAS, the boost threshold is not affected by the blue channel DC offset of video signal processing unit 10 because the DC offset is cancelled by adjustable bias voltage VBIAS. However, in the type of the roll-off compensation network described with respect to FIG. 2, in which the threshold element is coupled between the emitter of transistor QD and the source of bias voltage VBOOST, if the source of bias voltage VBOOST is not adjustable, the boost threshold will vary inversely with the DC offset at the B output of video processing unit 10. Making bias voltage VBIAS adjustable will solve this problem. However, an adjustable source of boost threshold bias voltage VBOOST will increase the cost of the system. Moreover, the the level of bias voltage VBOOST necessary to compensate for the DC offset will probably not correspond to the needed boost threshold.

While, the type of roll-off compensation network discussed with respect to FIG. 1, has advantages over the type of roll-off compensation network discussed with respect to FIG. 2, it also has some inherent disadvantages. In the case of the type of network discussed with respect to FIG. 1, the diode or diodes offer only discrete breakpoints for the boost threshold, roughly at integer multiples of the forward voltage drop of a diode. None of the discrete breakpoints may coincide with the point at which the phosphor inefficiency begins. In addition, the temperature sensitivity of the arrangement is a function of the number of diodes used.

With regard to the modification of the arrangement shown in FIG. 1 in which a Zener diode is employed, it is noted that a low voltage Zener diode is required. Such Zener diodes have an "on" voltage which is very much a function of the current through it. This results in an unpredictable boost threshold.

Both types of roll-off compensation networks discussed with respect to FIGS. 1 and 2 have the inherent problem that the boost threshold and the boost gain are relatively dependent on one another because the components which determine these characteristics are connected in series with one another. Further, the capacitance of a diode type of switching arrangement may adversely effect the transient response of the blue channel compared to the red and green channels. With regard to the modification of the arrangement shown in FIG. 1 in which a Zener diode is employed, it is noted that the capacitive effects of Zener diodes tend to be more significant than those of ordinary diodes. Still further, the leakage current of a diode may cause current boosting when none is wanted.

Thus, there is a need in the art for a roll-off compensation network which provides as many desirable aspects of the arrangements described with respect to FIGS. 1 and 2 and which avoids as many of their deficiencies as possible.

SUMMARY OF THE INVENTION

In accordance with an aspect of the invention, a CRT driver includes a controllable gain determining network, suitable for use as a blue roll-off compensation network, which comprises a three terminal semiconductor device having a controllable conduction path between first and second terminals and a control terminal for controlling the conduction of the conduction path instead of a diode switching arrangement. The controllable conduction path of the three terminal device is connected in series with a gain changing impedance between the current path of the CRT driver and a reference potential point, and the control terminal of the three terminal is also coupled to the current path of the CRT driver so as to sense the current flowing through it. The conduction path of the switching device is rendered conductive when the current flowing through the current path of the CRT driver reaches a predetermined threshold. At least one advantage of this arrangement over the arrangements discussed with respect to FIGS. 1 and 2 is that the switching threshold is relatively independent of the amount of gain change.

In accordance with another aspect of the invention, when the CRT driver includes an amplifying transistor having a conduction path between first and second electrodes and a control electrode for controlling the conduction of the conduction path, the first electrode being coupled to an output of the driver, the second electrode being coupled to the reference potential point, and the control electrode being coupled to a video signal source, the conduction path of the three terminal device is coupled in series with the gain changing impedance between the second electrode of the amplifying transistor and the reference potential point, and the control terminal of the three terminal device is connected to a point within a voltage divider network which is connected between the second electrode of the amplifying transistor and of reference potential point. In accordance with a related aspect of the invention, a source of a variable bias voltage may be coupled in series with the gain determining impedance to allow an unpredictable DC offset of the video signal source to be cancelled. In accordance with still another related aspect of the invention, an adjustable impedance may be connected in series with the source of bias voltage to allow a color temperature adjustment.

These and other aspects of the invention will be described with reference to the accompanying Drawing.

BRIEF DESCRIPTION OF THE DRAWING

In FIGS. 1, 2 and 3, corresponding elements and signals are identified in the same or similar manner. Those portions of the arrangement shown in FIG. 3 which have been previously described with respect to FIGS. 1 and 2 will not be described again in detail with respect to FIG. 3.

DETAILED DESCRIPTION OF THE PREFERRED EMBODIMENT

Figure 1:
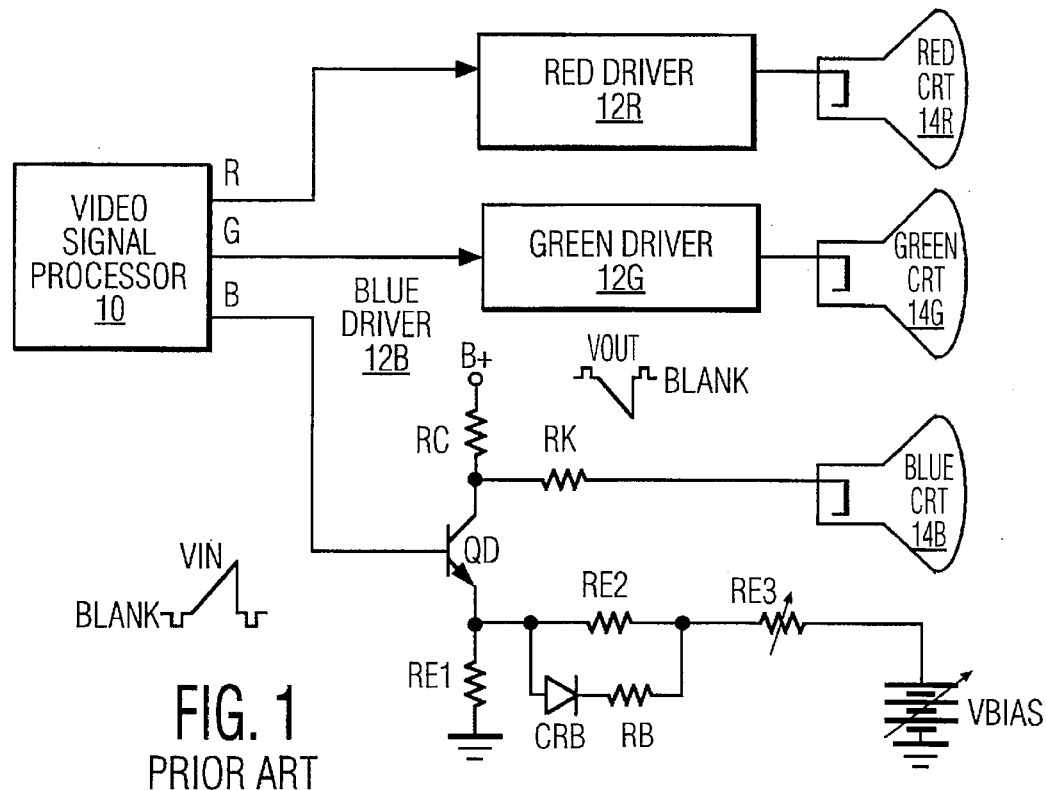
FIGS. 1 and 2, previously described, are schematic diagrams of the output stages of projection television systems including blue CRT drivers with respective blue phosphor roll-off compensation networks of the type known in the prior art.
Figure 2:
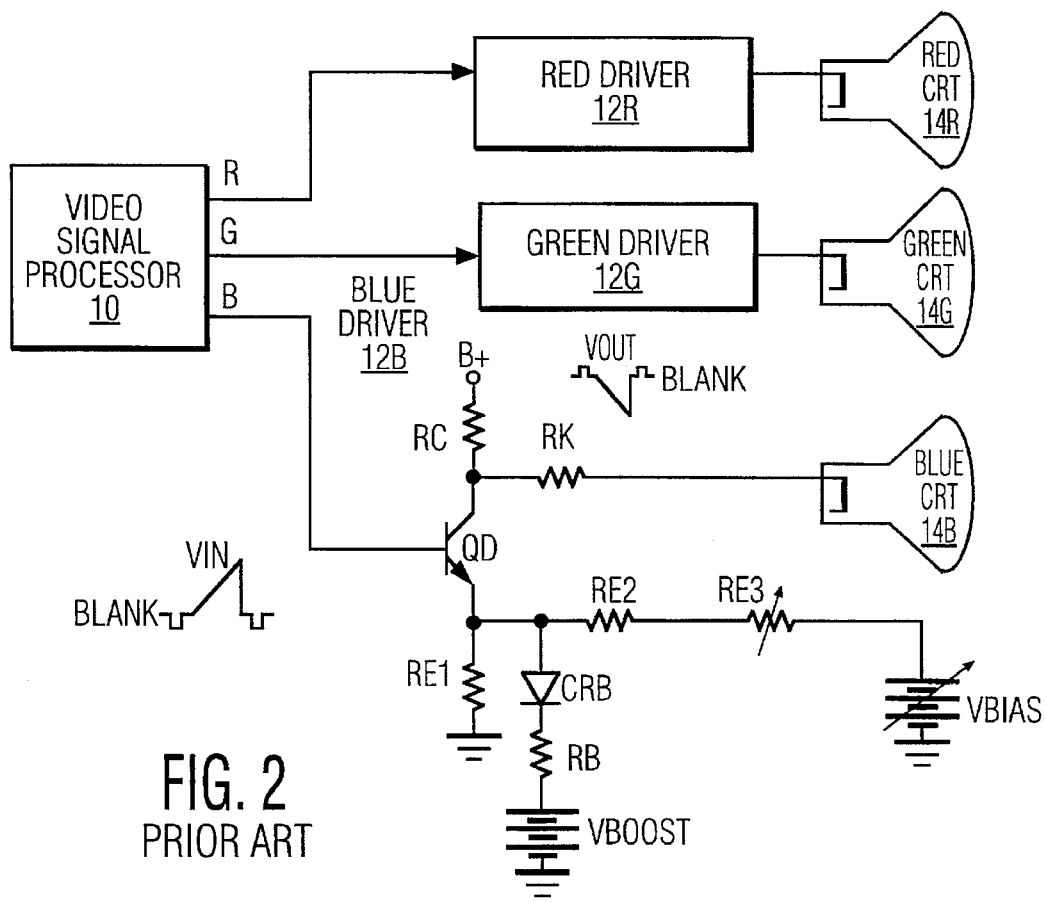
Figure 3:
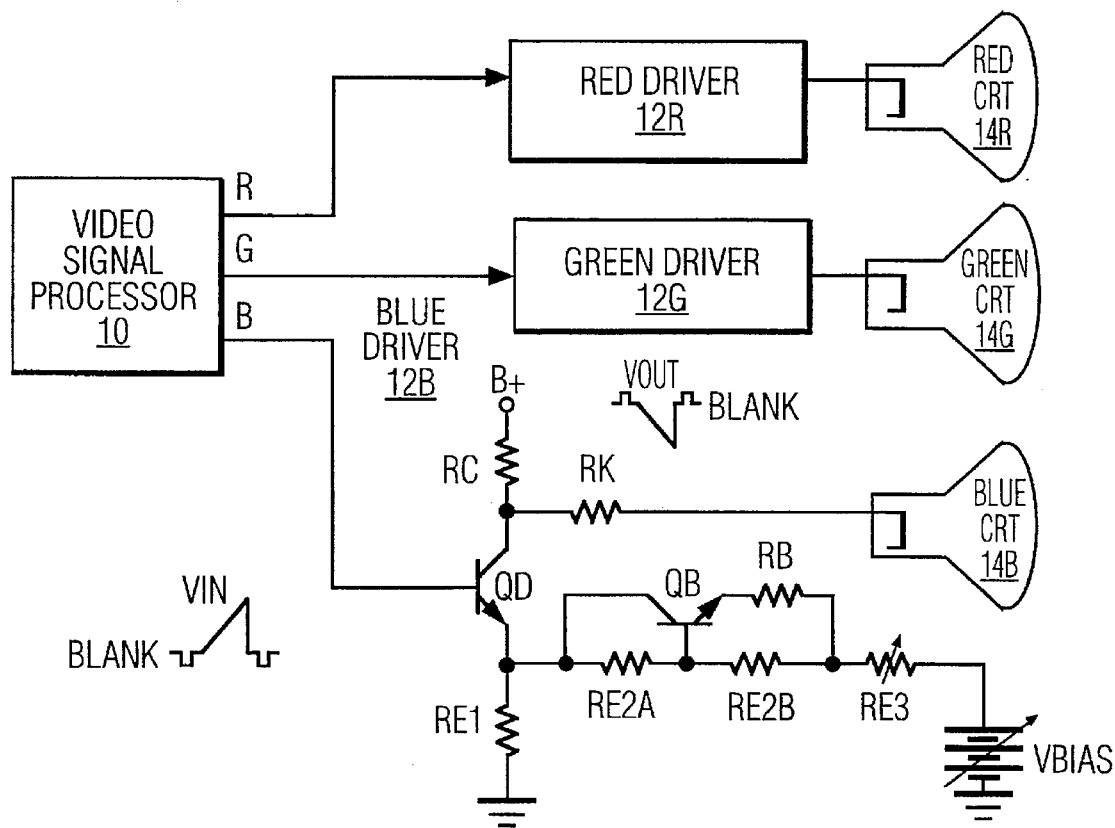
FIGS. 3 is a schematic diagram of the output stage of a projection television receiver including a blue CRT driver with a blue phosphor roll-off compensation network of the type constructed in accordance with the invention.

In the projection television system shown in FIG. 3, the switching device for the blue phosphor roll-off compensation network comprises a transistor rather than a diode as is used in the roll-off compensation networks described with respect to FIGS. 1 and 2. The use of a transistor allows the boost threshold determining portion of the network to be isolated from the boost magnitude determining portion of the network. As a result, the boost threshold is relatively independent of the boost magnitude.

The basic configuration of the roll-off compensation network shown in FIG. 3 more closely resembles the basic configuration of the roll-off compensation network shown in FIG. 1 than it resembles the basic configuration of the roll-off compensation network shown in FIG. 2. Resistor RE2 of the arrangement shown in FIG. 1 is replaced by two resistors RE2A and RE2B, comprising a voltage divider. The voltage divider is connected in series with variable resistor RE3 and the source of bias voltage VBIAS between the emitter of transistor QD and a point of signal ground. The base of an NPN transistor QB is connected to the junction of resistors RE2A and RE2B. The collector of transistor QB is connected to the emitter of transistor QD, and the emitter of transistor QB is coupled to the junction of resistor RE2B and variable resistor RE3 through resistor RB.

As in the arrangements shown in FIGS. 1 and 2, adjustable voltage bias VBIAS is set to compensate for the DC offset at the blue (B) output of video signal processing unit 10 and variable resistor RE3 is initially set to zero ohms. Under these conditions, the resistors RE2A and RE2 B can be selected to determine the boost threshold, i.e., the point at which roll-off compensation is to begin. Resistor RB is selected to determine the boost magnitude. The boost threshold and the boost magnitude are substantially independent of one another because the threshold determining potion of the roll-off compensation network comprising resistors RE2A and RE2B and the magnitude determining portion of the roll-off compensation network comprising resistor RB are in separate parallel paths rather than being connected in series.

Transistor QD is non-conductive for relatively low amplitudes of the blue input voltage. As the amplitude of the blue video input voltage increases, the current flowing through the collector-emitter junction of transistor QD increases and the emitter voltage of transistor QD increases. As a result, the currents flowing through resistors RE2A and RE2B increase. The currents flowing through resistors RE2A and RE2B are substantially the same because the magnitude of the base current of transistor QB is relatively low. Transistor QB is rendered conductive when the voltage drop across resistor RE2B approaches the forward base-emitter voltage drop (Vbe) of transistor QB, typically in the order of 0.7 volts. When transistor QD is conductive, resistor RB is effectively connected in parallel with the series combination of resistors RE2A and RE2B. In practice, resistors RE2A and RE2B have a combined resistance value which is significantly larger (e.g., in the order 2–4 times larger) than the resistance value of resistor RB so that resistor RB effectively determines the boost magnitude.

The blue roll-off compensation network shown in FIG. 3 has several advantages over the types of roll-off compensation networks discussed with respect to FIGS. 1 and 2. As earlier noted, the boost threshold is substantially independent of the boost magnitude. It also offers the advantage over the type of roll-off compensation network described with respect to FIG. 1 of allowing the selection of a boost threshold which is not limited to being an integer multiple of a diode drop or being a Zener diode voltage. Additionally, the capacitive characteristics are no worse than that of a single diode and better than that of a Zener diode. Further in this regard, transistor QD does not have to be driven into saturation while a diode typically is. The roll-off compensation network shown in FIG. 3 also has the advantages of the type of roll-off compensation network discussed with respect to FIG. 1: it does not have the DC offset problem caused by the DC level developed at the output of video signal processing unit 10; and it tracks the color temperature adjustment of variable resistor RE3.

While the present invention has been described by way of example with respect to the preferred embodiment shown in FIG. 3, various modifications may become apparent to those skilled in the art.

For example, while the invention has been described with respect to a relatively simple CRT driver comprising a simply common emitter amplifier is used, the invention is clearly useful with other driver configurations, such as one in which a cascode amplifier is used in place of transistor QD. Further in this vein, although the load of transistor QD is shown as comprising a resistor RC, the load may be more complex and may include active devices, such as complementary emitter-follower configured transistors connected in a push-pull arrangement. Still further, while the CRT driver of the preferred embodiment employs a bipolar transistor, the invention is also useful with CRT drivers which employ a field effect transistor (FET).

As to the roll-off compensation network itself, while a bipolar transistor is employed in the preferred embodiment, a FET may also be employed. In this regard, other types of three terminal switching devices having a controllable conduction channel and a control input for controlling the conduction of the conduction channel may be employed as well. Further, while transistor QB has been described as operating as a device which switches form one defined state to another, it is contemplated that in some applications it may operate in a more gradual manner.

It is also noted while the topology of the preferred embodiment provides the advantages of the arrangement shown in FIG. 1, while avoiding its deficiencies, as detailed above, other topologies, which may not provide all of the advantages of the preferred embodiment, are possible.

These and other modifications of the preferred embodiment are intended to be within the scope of the following claims.

We claim:

1. In a television system, apparatus comprising:

a cathode ray tube (CRT);

an amplifier having an input at which a video input signal is received and an output at which a video output signal is developed and which is coupled to said CRT; said amplifier having a main current path coupled to said output of said amplifier; and a three terminal switching device having a conduction path between first and second terminals and a control terminal for controlling the conduction of said conduction path; said conduction path of said switching device being connected in series with a first impedance element between said main current path of said amplifier and a point of reference potential; said control terminal of said switching device being coupled to said main current path of said amplifier to control the conduction of said conduction path of said switching device in response to the current flowing in said main current path of said amplifier.

2. The apparatus recited in claim 1, wherein:

said amplifier includes a first transistor having a conduction path between first and second electrodes and a control electrode for controlling the conduction of said conduction path of said first transistor; said control electrode of said first transistor being coupled to said input of said amplifier; said first electrode of said first transistor being coupled to said output of said amplifier; said conduction path of said first transistor comprising said main current path of said amplifier; said second electrode of said first transistor being coupled to both said conduction path of switching device and said control terminal of said switching device.

3. The apparatus recited in claim 2, wherein:

said control terminal of said switching device is coupled to a point between first and second ends of a voltage divider; said voltage divider being coupled between said second electrode of said first transistor and said point of reference potential.

4. The apparatus recited in claim 3, wherein:

said voltage divider is connected in series with a source of bias voltage between said second electrode of said first transistor and said point of reference potential.

5. The apparatus recited in claim 4, wherein:

said source of bias voltage is adjustable.

6. The apparatus recited in claim 3, wherein:

said first terminal of said switching device is coupled to said first end of said voltage divider and said second terminal of said switching device is coupled to said second end of said voltage divider through said first impedance element.

7. The apparatus recited in claim 6, wherein:

said second end of said voltage divider is coupled to said point of reference potential through a path including a second impedance device.

8. The apparatus recited in claim 6, wherein:

said second end of said voltage divider is coupled to said point of reference potential through a path including a second impedance device and a source of bias potential.

9. The apparatus recited in claim 8, wherein:

said second impedance device and said source of bias voltage are adjustable.

10. The apparatus recited in claim 2, wherein:

said switching device includes a second transistor having a conduction path between first and second electrodes and a control electrode for controlling the conduction of said conduction path of said second transistor; said first electrode of said second transistor being coupled to said first terminal of said switching device; said second electrode of said second transistor being coupled to said second terminal of said switching device; and said control electrode of said second transistor being coupled to said control terminal of said switching device.

11. In a television system, apparatus comprising:

a source of a video signal;

a cathode ray tube (CRT);

an amplifier including a first transistor having a conduction path between first and second electrodes and a control electrode for controlling the conduction of said conduction path; said control electrode of said first transistor being coupled to said video signal source input of said amplifier; said first electrode being coupled to said CRT; and a three terminal switching device having a conduction path between first and second terminals and a control terminal for controlling the conduction of said conduction path of said switching device; said conduction path of said switching device being connected in series with a first impedance element between said second electrode of said first transistor and a point of reference potential; said control terminal of said switching device being coupled to said second electrode of said first transistor to control the conduction of said conduction path of said switching device in response to the current flowing in said conduction path of said first transistor.

12. The apparatus recited in claim 11, wherein:

a voltage divider having first and second ends and an intermediate point between said first and second ends is coupled between said second electrode of said first transistor and said point of reference potential;

said switching device includes a second transistor having a conduction path between first and second electrodes and a control electrode for controlling the conduction of said conduction path of said second transistor; said control electrode of said second transistor being coupled to said intermediate point of said voltage divider; said first electrode of said second transistor being coupled to said first end of said voltage divider; said second electrode of said second transistor being coupled to said second end of said voltage divider through said first impedance element.

13. The apparatus recited in claim 12, wherein:

said voltage divider is connected in series with a source of bias voltage between said second electrode of said first transistor and said point of reference potential.

14. The apparatus recited in claim 13, wherein:

said source of bias voltage is adjustable.

15. The apparatus recited in claim 12, wherein:

said second end of said voltage divider is coupled to said point of reference potential through a path including a second impedance device.

16. The apparatus recited in claim 15, wherein:

said second end of said voltage divider is coupled to said point of reference potential through a path including a second impedance device and a source of bias potential.

17. The apparatus recited in claim 16, wherein:

said second impedance device and said source of bias voltage are adjustable.

18. In a projection television system, apparatus comprising:

a source of a relatively low level video signal corresponding to blue components of a reproduced image;

a cathode ray tube (CRT) having a phosphor for emitting blue light;

an amplifier including a first transistor having a conduction path between first and second electrodes and a control electrode for controlling the conduction of said conduction path; said control electrode of said first transistor being coupled to said video signal source input of said amplifier; said first electrode being coupled to said CRT;

a voltage divider, having first and second ends and an intermediate point between said first and second ends, coupled between said second electrode of said first transistor and a point of reference potential;

a second transistor having a conduction path between first and second electrodes and a control electrode for controlling the conduction of said conduction path of said second transistor; said control electrode of said second transistor being coupled to said intermediate point of said voltage divider; said first electrode of said second transistor being coupled to said first end of said voltage divider; said second electrode of said second transistor being coupled to said second end of said voltage divider through a first impedance element.

19. The apparatus recited in claim 18, wherein:

said second end of said voltage divider is coupled to said point of reference potential through a path including a second impedance device and a source of bias potential.

20. The apparatus recited in claim 18, wherein:

said second impedance device and said source of bias voltage are adjustable.

* * * * *